United States Patent
Takiel

(10) Patent No.: US 10,268,680 B2
(45) Date of Patent: Apr. 23, 2019

(54) CONTEXT-AWARE HUMAN-TO-COMPUTER DIALOG

(71) Applicant: Google Inc., Mountain View, CA (US)

(72) Inventor: Piotr Takiel, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/446,908

(22) Filed: Mar. 1, 2017

(65) Prior Publication Data

US 2018/0189267 A1 Jul. 5, 2018

Related U.S. Application Data

(60) Provisional application No. 62/440,856, filed on Dec. 30, 2016.

(51) Int. Cl.
*G06F 17/27* (2006.01)
*G10L 15/22* (2006.01)
(Continued)

(52) U.S. Cl.
CPC .......... *G06F 17/279* (2013.01); *G06F 17/271* (2013.01); *G06F 17/2705* (2013.01);
(Continued)

(58) Field of Classification Search
CPC . G10L 15/1822; G06F 17/27; G06F 17/2705; G06F 17/28; G06F 17/30634; G06F 17/30734
See application file for complete search history.

(56) References Cited

U.S. PATENT DOCUMENTS 7,197,460 B1 * 3/2007 Gupta ............... G10L 15/22
704/251
7,555,431 B2 6/2009 Bennett
(Continued)

FOREIGN PATENT DOCUMENTS

EP 3096246 11/2016

OTHER PUBLICATIONS

Gregoromichelaki, Eleni, et al. "Incrementality and intention-recognition in utterance processing." D&D 2.1 (2011): 199-233.
(Continued)

*Primary Examiner* — Douglas Godbold
*Assistant Examiner* — Mark Villena
(74) *Attorney, Agent, or Firm* — Middleton Reutlinger

(57) ABSTRACT

Methods, apparatus, and computer readable media are described related to utilizing a context of an ongoing human-to-computer dialog to enhance the ability of an automated assistant to interpret and respond when a user abruptly transitions between different domains (subjects). In various implementations, natural language input may be received from a user during an ongoing human-to-computer dialog with an automated assistant. Grammar(s) may be selected to parse the natural language input. The selecting may be based on topic(s) stored as part of a contextual data structure associated with the ongoing human-to-computer dialog. The natural language input may be parsed based on the selected grammar(s) to generate parse(s). Based on the parse(s), a natural language response may be generated and output to the user using an output device. Any topic(s) raised by the parse(s) or the natural language response may be identified and added to the contextual data structure.

14 Claims, 9 Drawing Sheets

(51) Int. Cl.
  *G10L 15/19* (2013.01)
  *G06F 17/30* (2006.01)
(52) U.S. Cl.
  CPC .... *G06F 17/2785* (2013.01); *G06F 17/30654* (2013.01); *G10L 15/19* (2013.01); *G10L 15/22* (2013.01)

(56) References Cited

U.S. PATENT DOCUMENTS

| | | | | |
|---|---|---|---|---|
| 8,346,563 | B1* | 1/2013 | Hjelm | G10L 15/1822 379/88.01 |
| 8,645,122 | B1* | 2/2014 | Di Fabbrizio | G10L 21/00 704/231 |
| 8,731,942 | B2 | 5/2014 | Cheyer et al. | |
| 9,495,962 | B2 | 11/2016 | Govrin et al. | |
| 2001/0021909 | A1 | 9/2001 | Shimomura et al. | |
| 2003/0040901 | A1* | 2/2003 | Wang | G06F 17/274 704/4 |
| 2003/0061029 | A1 | 3/2003 | Shaket | |
| 2004/0044516 | A1 | 3/2004 | Kennewick et al. | |
| 2005/0216269 | A1* | 9/2005 | Scahill | G06F 17/30663 704/270.1 |
| 2005/0288935 | A1 | 12/2005 | Lee et al. | |
| 2006/0047362 | A1 | 3/2006 | Aoyama et al. | |
| 2006/0074671 | A1* | 4/2006 | Farmaner | G10L 15/193 704/257 |
| 2007/0100618 | A1 | 3/2007 | Lee et al. | |
| 2008/0091406 | A1* | 4/2008 | Baldwin | G10L 15/22 704/4 |
| 2008/0221892 | A1* | 9/2008 | Nathan | G06F 17/279 704/257 |
| 2009/0030697 | A1 | 1/2009 | Cerra et al. | |
| 2010/0217592 | A1* | 8/2010 | Gupta | G06F 17/279 704/236 |
| 2010/0217604 | A1* | 8/2010 | Baldwin | G06Q 30/02 704/275 |
| 2013/0144616 | A1* | 6/2013 | Bangalore | G10L 15/1822 704/226 |
| 2015/0149177 | A1* | 5/2015 | Kalns | G10L 15/1822 704/257 |
| 2015/0279366 | A1* | 10/2015 | Krestnikov | G10L 15/26 704/235 |
| 2016/0132484 | A1* | 5/2016 | Nauze | G06F 17/2735 704/9 |
| 2016/0163311 | A1* | 6/2016 | Crook | G10L 15/183 704/275 |

OTHER PUBLICATIONS

Fisher, Robert WH. Context Awareness and Personalization in Dialogue Planning. Diss. University of Washington, 2014. 62 pages.
Gargett, Andrew, et al. "Dialogue-grammar correspondence in dynamic syntax." Semantics and Pragmatics of Dialogue (Londial) (2008): 37. 8 pages.
Kempson, Ruth, et al. "Grammar resources for modelling dialogue dynamically." Cognitive Neurodynamics 3.4 (2009): 23 pages.
Kempson, Ruth, et al. "Incrementality, Dialogue and Syntax." The Dynamics of Conversational Dialogue (DynDial). Jun. 7, 2010. Presentation. 138 pages.
Porzel, Robert, et al. "Towards context-adaptive natural language processing systems." 2002; 12 pages.
United Kingdom Intellectual Property Office; Examination Report issued in Application No. GB1715746.2 dated Feb. 28, 2018.
Intellectual Property Office of Singapore—International Searching Authority; Notification of Transmittal of the International Search Report and the Written Opinion of PCT Serial No. PCT/US2017/052721; dated Dec. 27, 2017.

* cited by examiner

270

```
(allow_if (high person))
(rule $where_person_born (where was he born)
    (= (event_name where_person_born)))

(allow_if (high city))
(rule $where_city (where is that)
    (= (event_name where_city_located)))

(allow_if (medium country) (medium district))
(rule $capitol (What is the capitol)
    (= (event_name identify_capitol)))

(allow_if (high city) (high city))
(rule $distance (How far from the capital)
    (= (event_name distance_between_cities)))

(allow_if (low artist))
(rule $similar_artists (Do you know any similar artist)
    (= (event_name find_similar_artists)))
```

272

USER[0]: What's this music?
AA[0]: It's Opus 20 in C Sharp Minor by Chopin.
USER[1]: Interesting. Where was he born?
AA[1]: He was born in Żelazowa Wola.
USER[2]: Where is that?
AA[2]: Żelazowa Wola is a city in Masovian district in Poland.
USER[3]: How far from the capitol?
AA[3]: It's 39 miles away.
USER[4]: Do you know any similar artists?
AA[4]: Sure, I recommend Franz Liszt, Ludwig van Beethoven or Franz Schubert.

Fig. 2

CONTEXT-AWARE HUMAN-TO-COMPUTER DIALOG

BACKGROUND

Users are increasingly able to interact with computers using natural language, e.g., in what will be referred to herein as "human-to-computer dialogs." For example, many mobile computing devices such as smart phones, tablets, smart watches, standalone smart speakers, and so forth, include software programs referred to as "automated assistants" (a.k.a. "interactive assistant modules," "mobile assistants," etc.). Automated assistants may be configured to parse and interpret natural language input (e.g., spoken first then converted to text, or received initially as text) and provide responsive output, such as answers to questions, task initiation, etc. Existing automated assistants often have difficulty switching between domains of conversation. For example, if a user and an automated assistant have been exchanging dialog about a subject in one topic or domain (e.g., playing a game), and then the user abruptly steers the conversation towards another topic in an unrelated domain (e.g., weather), the automated assistant may not be entirely responsive and/or may require additional dialog to properly respond. One possible reason is that automated assistants tend to be created and/or maintained by a relatively small number of entities (e.g., a single developer). It may be difficult for such a small number of entities to anticipate how users may transition between innumerable possible conversational domains/topics and design robust dialogs, grammars, etc., for each such domain/topic.

SUMMARY

Techniques are described herein for utilizing a context of an ongoing human-to-computer dialog to enhance the ability of an automated assistant (or more generally, an interactive voice response "IVR" component) to interpret and respond when a user abruptly transitions the human-to-computer dialog between different domains. In various implementations, a so-called "contextual data structure" may be used to persist various "topics" that are relevant to an ongoing human-to-computer dialog. These topics may be used, for instance, to select one or more grammars that are used to parse the user's natural language input.

Based on parses produced by the selected grammars, and in some cases further based on a dynamic dialog tree that represents the ongoing human-to-computer dialog, a response (e.g., natural language response, initiation of a task, etc.) may be generated and provided by the automated assistant. Meanwhile, any new topics added to the ongoing dialog by the user and/or by the automated assistant may be added to the contextual data structure. Topics that have not been mentioned or alluded to in some time may be dropped. In this way, if a user provides natural language input that is not immediately pertinent but was pertinent to some previous topic of the ongoing dialog, the automated assistant may be able to seamlessly pivot back to the previous topic.

In some implementations, techniques described herein may be implemented on a system that includes a parser subsystem and a response subsystem. The parser subsystem may be responsible for interpreting natural language input and providing an interpretation (e.g., a "parse" and/or a topic) to the response subsystem. The response subsystem may be responsible for receiving the interpretations and responding appropriately, be it by generating and outputting a natural language response or by taking some other responsive action (e.g., launching a particular app).

In some implementations, the parser subsystem may be configured to select one or more grammars to parse received natural language input based on one or more topics stored in the aforementioned contextual data structure associated with the ongoing human-to-computer dialog. For example, in some implementations, each of a plurality of grammars (e.g., a library of grammars which may potentially be very large) may be stored in association with one or more applicable topics. A grammar may be selected/applied if one or more of its associated topics is currently pertinent (and/or pertinent enough) to the human-to-computer dialog, and may not be applied otherwise. Thus, when a user provides natural language input, only those grammars that are associated with currently-pertinent topics are selected and applied. This technique is occasionally referred to herein as "contextual filtering." Contextual filtering provides a technical advantage of avoiding grammars that do not make sense in the context of the conversation, and hence might result in nonsensical output. In some cases this may reduce the number of grammars that are applied to each natural language input received from a human (as opposed to applying all grammars of a potentially enormous library to each natural language input). Reducing the number of grammars applied reduces utilization of computing resources such as processor cycles, memory, and/or network bandwidth. This may be particularly beneficial for human-to-computer dialogs because minimizing latency of an automated assistant (i.e. making sure the automated assistant responds to user input as quickly as possible) may be of paramount importance to users. If a human-to-computer dialog has just been initiated, and hence no topics are yet pertinent, the parser subsystem may process received natural language input using conventional techniques. The parser subsystem may then begin to populate the contextual data structure based on topics raised by a human or by an automated assistant during the human-to-computer dialog.

Interacting with both the parser subsystem and the response subsystem is the aforementioned contextual data structure. The contextual data structure may take various forms of data structures stored in memory, and may be used to persist topics that are, or have recently been, relevant to an ongoing human-to-computer dialog. When a topic is raised, either by the user or by the automated assistant, the topic may be added to the contextual data structure, e.g., by the response subsystem. If a topic is raised that is already persisted in the contextual data structure, the topic may be "touched," e.g., it may be brought to the forefront of the conversation once again.

To this end, in various implementations, each topic persisted in the contextual data structure may be associated with a measure of relevance of the topic to the ongoing human-to-computer dialog. For example, in some implementations, a measure of relevance associated with each topic may be determined based at least in part on a count of turns of the ongoing human-to-computer dialog since the topic was last raised. The more turns since the topic was raised (e.g., added or touched), the lower the measure of relevance for that topic. Suppose a user began a human-to-computer dialog with a question about the weather (causing the topic "weather" to be added), but the dialog then covered a wide range of topics unrelated to weather. The more turns into the dialog since the topic of weather was raised, the more the relevance score associated with the topic weather is diminished. In some implementations, if a topic's measure of relevance diminishes below a threshold, that topic may be dropped from the contextual data structure altogether. Dropping "stale" topics from the contextual data structure may offer various technical advantages. The more grammars that are selected (i.e. contextually filtered as described above) and applied by the parser subsystem to each natural language input received from the user, the more computing resources are consumed. By dropping stale topics, the number of grammars applied by the parser subsystem to each natural language input may be reduced, thereby reducing computing resource consumption. Additionally, by focusing the parser subsystem on grammars associated with topics pertinent to a current human-to-computer dialog, it is less likely that off-topic or otherwise nonsensical parses will be produced (which may lead the automated assistant to provide similarly-nonsensical output). Thus, the number of human-to-computer dialog turns (and hence, user-provided natural language inputs) required to achieve a user's particular goal may be reduced, which may benefit users with limited physical or situational abilities to provide multiple inputs.

Measures of relevance may be based on other factors as well. For example, in some implementations, a measure of relevance associated with each topic may be determined based at least in part on a measure of relatedness (e.g., semantic) between the topic and one or more other topics in the contextual data structure. If a first topic has not been raised in a while, but a semantically-related second topic is raised later, the first topic's measure of relevance may be raised.

In some implementations, the contextual data structure may take the form of an undirected graph comprising a plurality of nodes and a plurality of edges connecting the plurality of nodes. Each node of the undirected graph may represent a given topic of the one or more topics stored as part of the contextual data structure. In some implementations, each node may also store a count of turns of the ongoing human-to-computer dialog since the given topic was last raised. In some implementations, each edge connecting two nodes may represent a measure of relatedness (e.g., semantic, etc.) between two topics represented by the two nodes, respectively. Of course, other data structures are contemplated herein.

In some implementations, each grammar may be associated both with a topic and a threshold relevance score for that topic. If the topic is persisted in the contextual data structure but its relevance score does not satisfy the threshold, the grammar may not be selected. This enables fine-tuning of when grammars will be applied and when they won't.

In various implementations, the response subsystem may receive interpretations (or "parses") from the grammars that are selected and applied by the parser subsystem. In some implementations, the parser subsystem may also provide the response subsystem with topics, e.g., as part of the parses/interpretations and/or separately. In some implementations, these topics may be already persisted in the contextual data structure and that have been touched by virtue of their associated grammars having been applied. In various implementations, the response subsystem may employ a dialog tree to steer the ongoing human-to-computer dialog between seemingly unrelated topics. In essence, the response subsystem receives one or more parses (or interpretations) and topics from the parser subsystem, and steers the conversation along the dialog tree based on the parses and topics.

For example, in some implementations, each node in the dialog tree represents a natural language process. A root node of the dialog tree may be configured to handle any natural language input (either by initiating a process or by requesting disambiguation from the user) and to initiate one or more child nodes corresponding to processes that are initiated in response to natural language input from the user. The child processes may themselves add additional child processes to handle various aspects of their own internal dialog. This may simplify code maintenance and reuse, as each process may be a modular process that is configured to implement techniques described herein.

Whenever the response subsystem generates a response (e.g., a natural language response, a responsive action or task, etc.) for the user, the response subsystem may add any related topics to the contextual data structure. In some implementations, each node of the dialog tree may be associated with one or more topics (which may, for instance, be selected by a developer of the process underlying the node). As noted above, each grammar also may be associated with one or more topics. Consequently, by adding these topics to the contextual data structure, the response subsystem in effect adds the number of grammars that may be applicable by the parser subsystem at any point in time. Thus, if a user converses about one topic, changes course, then returns to the original topic (or to a semantically-related topic), grammars associated with that original topic may still be applicable because their associated topics are still persisted in the contextual data structure. But as noted above, if the human-to-computer dialog strays from a given topic for long enough, in some implementations, the topic may be dropped from the contextual data structure, e.g., to prevent the parser subsystem from applying an excessive number of grammars to each natural language input, which as noted above can become computationally expensive.

As an example, suppose a user initiates a human-to-computer dialog with the phrase, "Let's play a game." The response subsystem may start the dialog tree at the root node. The parser subsystem may parse/interpret the user's natural language input and provide the response subsystem with the parse/interpretation and any raised topics (e.g., game). Based on the received parse and topic(s), the response subsystem may provide dialog such as, "OK, what game do you want to play?", and to initiate a gaming child process beneath the root node. The response subsystem may also add topics such as "game" and "game selection" (which may be determined by the parser subsystem based on the received input and/or by the response subsystem based on topics associated with the gaming child process) to the contextual data structure. The gaming child process may be associated (e.g., by its developer) with one or more topics, each which may be associated with one or more topics related to games, such as "game," "game selection." One grammar that may be associated with such topics may be, for instance, a list_available_games grammar. Another grammar associated with such topics may be, for instance, "number_of_players" grammar. Suppose the user now utters, "What games do you have?" The parser subsystem may select the list_available_games grammar because its topic(s) (game, game selection) are currently in the contextual data structure with relatively high measures of relevance (because they were just recently raised). The list_available_games grammar may parse the user's statement and provide its interpretation (e.g., the command, "LIST GAMES") to the response subsystem. Consequently, the automated assistant (e.g., by way of the response subsystem) may list available games, such as "I have Sports Trivia and Historical Trivia." The response subsystem may also add topics such as "trivia," "sports" and "history" to the contextual data structure, and may add, to the dialog tree, child process nodes corresponding to the Sports Trivia and Historical Trivia games.

Now, suppose the user abruptly changes the subject, such as by uttering, "What's the weather forecast today?" There may not currently be any topics stored in the contextual data structure that are related to the topic "weather." In some implementations, the parser subsystem may identify (e.g., contextually filter from a large repository of grammars) one or more grammars that are associated with each topic raised by this utterance, such as "weather." The parser subsystem may provide the response subsystem with one or more parses produced by the one or more identified grammars, as well as the corresponding topic(s). The response subsystem may attempt to associate (e.g., match) existing dialog tree nodes with the parses/topic(s) returned by the parser subsystem. In some cases, a parse/topic provided by the parser subsystem may be associable (e.g., match) a dialog tree node if (i) a topic associated with the dialog tree node matches the topic of the parse/topic, and (ii) the dialog tree node is capable of handling the parse of the parse/topic. If one or both conditions are not satisfied, control may pass back to the root node of the dialog tree. That is likely the case in this example because the topic "weather" is likely not going to match any of the aforementioned topics that have already been added to the dialog tree. Accordingly, the response subsystem may load a child process node associated with the topic "weather," and may provide a response such as "Cloudy with a 30% chance of rain." The response subsystem may also add the topic "weather" to the contextual data structure, and in some cases may reduce the measures of relevance associated with topics unrelated to weather that are already contained in the contextual data structure, such as "game," "game selection," "trivia," "sports," and "history."

Suppose the user now utters, "Sports Trivia." Even though the user most recently changed the subject of the human-to-computer dialog to "weather," the topics of "game," "game selection," "trivia," "sports," and "history" are all still stored in the contextual data structure, albeit with slightly reduced measures of relevance. Accordingly, the parser subsystem may still select (e.g., contextually filter from a larger repository of grammars) one or more grammars associated with these topics to parse the user's utterance. The parser subsystem may then apply the selected grammars to the input, and may provide the resulting parses and associated topics to the response subsystem. The response subsystem may then pass control to the Sports Trivia child process node that was added to the dialog tree previously.

Techniques described herein may give rise to a variety of additional technical advantages beyond those already mentioned. For example, the techniques described herein enable smooth changing of conversation subjects without requiring individual developers (e.g., of individual IVR processes) to expend considerable resources handling such subject changing. Additionally or alternatively, because grammars are only applicable when particular topics are relevant (and in some cases, must have measures of relevance that satisfy various thresholds), the use of techniques described herein also limit the number of generated parses/interpretations to only those which make sense in the current dialog context. This may save computation resources such as memory, processor cycles, network bandwidth, etc.

In some implementations, techniques described herein facilitate modular design of IVR dialogs to be implemented by automated assistants. Such modular design (including the hierarchal structure of dialog trees described herein) may be easier to maintain, and may allow also for easy code reuse. An additional technical advantage of some implementations is that the dialog trees described herein allow all business logic to be easily developed in a single programming language (such as C++). Consequently, the development time decreases compared to solutions involving several programming languages.

In some implementations, a method performed by one or more processors is provided that includes: receiving natural language input from a user as part of an ongoing human-to-computer dialog between the user and an automated assistant operated by one or more processors; selecting one or more grammars to parse the natural language input, wherein the selecting is based on one or more topics stored in memory as part of a contextual data structure associated with the ongoing human-to-computer dialog; parsing the natural language input based on the selected one or more grammars to generate one or more parses; generating, based on one or more of the parses, a natural language response; outputting the natural language response to the user using one or more output devices; identifying one or more topics raised by one or more of the parses or the natural language response; and adding the identified one or more topics to the contextual data structure.

These and other implementations of technology disclosed herein may optionally include one or more of the following features.

In various implementations, the one or more grammars may be selected from a plurality of grammars, and wherein each of the plurality of grammars is stored in association with one or more applicable topics. In various implementations, each topic stored in the memory as part of the contextual data structure may be associated with a measure of relevance of the topic to the ongoing human-to-computer dialog. In various implementations, a measure of relevance associated with each topic may be determined based at least in part on a count of turns of the ongoing human-to-computer dialog since the topic was last raised.

In various implementations, a measure of relevance associated with each topic may be determined based at least in part on a measure of relatedness between the topic and one or more other topics in the contextual data structure.

In various implementations, the contextual data structure may include an undirected graph comprising a plurality of nodes and a plurality of edges connecting the plurality of nodes. In various implementations, each node of the undirected graph may represent a given topic of the one or more topics stored as part of the contextual data structure, and a count of turns of the ongoing human-to-computer dialog since the given topic was last raised. In various implementations, each edge connecting two nodes may represent a measure of relatedness between two topics represented by the two nodes, respectively.

In various implementations, the method may further include generating a dialog tree with one or more nodes that represent one or more interactive voice processes that have been invoked during the ongoing human-to-computer dialog. In various implementations, one or more of the nodes may be associated with one or more topics. In various implementations, the selecting may include selecting the one or more grammars from one or more grammars associated with the one or more topics.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 depicts example grammars that may be applied during a human-computer dialog, in accordance with various implementations.

DETAILED DESCRIPTION

Figure 1:
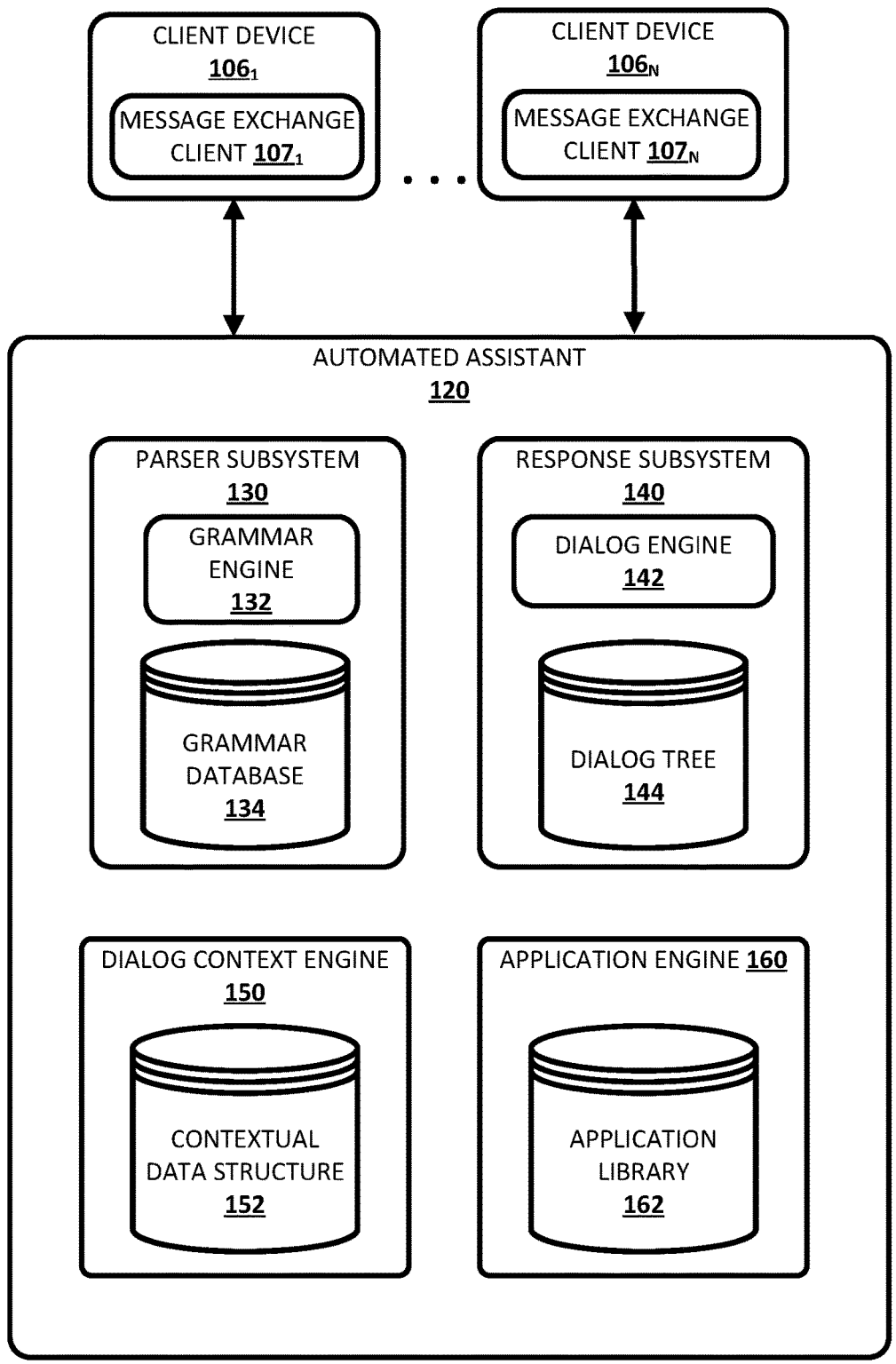
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$ and an automated assistant 120. Although automated assistant 120 is illustrated in FIG. 1 as separate from the client computing devices $106_{1-N}$, in some implementations all or aspects of the automated assistant 120 may be implemented by one or more of the client computing devices $106_{1-N}$. For example, client device $106_1$ may implement one instance of or more aspects of automated assistant 120 and client device $106_N$ may also implement a separate instance of those one or more aspects of automated assistant 120. In implementations where one or more aspects of automated assistant 120 are implemented by one or more computing devices remote from client computing devices $106_{1-N}$, the client computing devices $106_{1-N}$ and those aspects of automated assistant 120 may communicate via one or more networks such as a local area network (LAN) and/or wide area network (WAN) (e.g., the Internet).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with automated assistant 120 utilizing a plurality of client computing devices that collectively from a coordinated "ecosystem" of computing devices. However, for the sake of brevity, some examples described in this specification will focus on a user operating a single client computing device 106.

Each of the client computing devices $106_{1-N}$ may operate a variety of different applications, such as a corresponding one of the message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, the automated assistant 120 engages in human-to-computer dialog sessions with one or more users via user interface input and output devices of one or more client devices $106_{1-N}$. In some implementations, the automated assistant 120 may engage in a dialog session with a user in response to user interface input provided by the user via one or more user interface input devices of one of the client devices $106_{1-N}$. In some of those implementations, the user interface input is explicitly directed to the automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to the automated assistant 120 in one or more of the message exchange clients $107_{1-N}$ based on particular user interface input that indicates the automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, the automated assistant 120 may engage in a dialog session in response to user interface input, even when that user interface input is not explicitly directed to the automated assistant 120. For example, the automated assistant 120 may examine the contents of user interface input and engage in a dialog session in response to certain terms being present in the user interface input and/or based on other cues. In many implementations, the automated assistant 120 may engage interactive voice response ("IVR"), such that the user can utter commands, searches, etc., and the automated assistant may utilize one or more grammars to convert the utterances into text, and respond to the text accordingly.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by the automated assistant 120 may be distributed across multiple computer systems. Automated assistant 120 may be implemented as, for example, computer programs running on one or more computers in one or more locations that are coupled to each other through a network.

Automated assistant 120 may include a parser subsystem 130, a response subsystem 140, a dialog context engine 150, and an application engine 160. In some implementations, one or more of the engines and/or subsystems of automated assistant 120 may be omitted, combined, and/or implemented in a component that is separate from automated assistant 120. Automated assistant 120 may engage in human-to-computer dialog sessions with one or more user(s), via associated client devices $106_{1-N}$, to obtain information (e.g., answers to questions, obtain search results, etc.), initiate tasks (telephone applications, calendar applications, miscellaneous applications, etc.), engage in conversation, and so forth.

As used herein, a "dialog session" may include a logically-self-contained exchange of one or more messages between a user and the automated assistant 120 as part of a human-to-computer dialog. The automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of the automated assistant 120, and so forth.

In some implementations, when the automated assistant 120 provides a prompt that solicits user feedback, the automated assistant 120 may preemptively activate one or more components of the client device (via which the prompt is provided) that are configured to process user interface input to be received in response to the prompt. For example, where the user interface input is to be provided via a microphone of the client device $106_1$, the automated assistant 120 may provide one or more commands to cause: the microphone to be preemptively "opened" (thereby preventing the need to hit an interface element or speak a "hot word" to open the microphone), a local speech to text processor of the client device $106_1$ to be preemptively activated, a communications session between the client device $106_1$ and a remote speech to text processor to be preemptively established, and/or a graphical user interface to be rendered on the client device $106_1$ (e.g., an interface that includes one or more selectable elements that may be selected to provide feedback). This may enable the user interface input to be provided and/or processed more quickly than if the components were not preemptively activated.

Parser subsystem 130 of automated assistant 120 may process natural language input generated by users via client devices $106_{1-N}$ and may generate, based on one or more grammars selected using contextual filtering, annotated output that may include "parses" or "interpretations" for use by one or more other components of the automated assistant 120, such as response subsystem 140. For example, parser subsystem 130 may process natural language free-form input that is generated by a user via one or more user interface input devices of client device $106_1$. The generated annotated output includes one or more annotations of the natural language input (e.g., one or more topics) and optionally one or more (e.g., all) of the terms of the natural language input.

In some implementations, parser subsystem 130 may be configured to identify and annotate various types of grammatical information in natural language input. For example, parser subsystem 130 may include a part of speech tagger configured to annotate terms with their grammatical roles. For example, the part of speech tagger may tag each term with its part of speech such as "noun," "verb," "adjective," "pronoun," etc. Also, for example, in some implementations, parser subsystem 130 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, parser subsystem 130 may additionally and/or alternatively include an entity tagger configured to annotate entity references in one or more segments such as references to people (including, for instance, literary characters), organizations, locations (real and imaginary), topics, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity or topic and/or may optionally communicate with a knowledge graph or other entity database to resolve a particular entity and/or topic. In some implementations, parser subsystem 130 may additionally and/or alternatively include a coreference resolver configured to group, or "cluster," references to the same entity based on one or more contextual cues.

In some implementations, one or more components of parser subsystem 130 may rely on annotations from one or more other components of parser subsystem 130. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of parser subsystem 130 may use related prior input and/or other related data outside of the particular natural language input (e.g., topics maintained by dialog context engine 150) to determine one or more annotations.

In various implementations, dialog context engine 150 may be configured to persist one or more topics that have been raised during a current human-to-computer dialog session between a user of a client device 106 and automated assistant 120. In some implementations, dialog context engine 150 may maintain a so-called "contextual data structure" 152 in computer memory. Contextual data structure 152 may take various forms of data structures stored in memory, and may be used to persist topics that are, or have recently been, relevant to an ongoing human-to-computer dialog session. When a topic is raised, either by the user or by automated assistant 120, the topic may be added to contextual data structure 152, e.g., by dialog context engine 150 or by another component of automated assistant 120. If a topic is raised that is already persisted in contextual data structure 154, the topic may be "touched," e.g., it may effectively be brought to the forefront of the conversation once again. Put another way, topics persisted in contextual data structure 152 may represent the topics on which the user is likely focused during a particular human-to-computer dialog session (or in some implementations, across different human-to-computer sessions that occur relatively close in time). By at least temporarily maintaining these topics in contextual data structure 152, automated assistant 120 is better able to interpret natural language input from the user that is unrelated to the most recent topic of discussion, and thus is better able to adapt to the user changing the subject of the human-to-computer dialog.

To this end, each topic persisted in contextual data structure 152 may be associated with a measure of relevance of the topic to the ongoing human-to-computer dialog session. For example, in some implementations, a measure of relevance associated with each topic may be determined based at least in part on a count of turns of the ongoing human-to-computer dialog since the topic was last raised. The more turns since the topic was raised (e.g., added or touched), the lower the measure of relevance for that topic. Suppose a user began a human-to-computer dialog with a question about the weather (causing the topic "weather" to be added), but the dialog then covered a wide range of topics unrelated to weather. The more turns into the dialog since the topic of weather was raised, the more the relevance score associated with the topic weather is diminished. In some implementations, if a topic's measure of relevance diminishes below a threshold, that topic may be dropped from contextual data structure 152 altogether.

Measures of relevance may be based on other factors as well. For example, in some implementations, a measure of relevance associated with each topic in contextual data structure 152 may be determined based at least in part on a measure of relatedness (e.g., semantic) between the topic and one or more other topics in contextual data structure 152. If a first topic has not been raised in some time, but a semantically-related second topic is raised later, the first topic's measure of relevance may be elevated or increased.

In some implementations, contextual data structure 152 may take the form of an undirected graph comprising a plurality of nodes and a plurality of edges connecting the plurality of nodes. Each node of the undirected graph may represent a given topic of the one or more topics stored as part of contextual data structure 152. In some implementations, each node may also store a count of turns of the ongoing human-to-computer dialog since the given topic was last raised. In some implementations, each edge connecting two nodes may represent a measure of relatedness (e.g., semantic, etc.) between two topics represented by the two nodes, respectively. Of course, other data structures are contemplated herein.

In various implementations, parser subsystem 130 may include a grammar engine 132. Grammar engine 132 may have access to a grammar database 134 that includes a plurality of grammars. In various implementations, each grammar stored in grammar database 134 may be associated both with a topic and a threshold relevance score for that topic. If the topic is persisted in contextual data structure 152 but its relevance score does not satisfy the threshold, the grammar may not be selected by parser subsystem 130. This enables fine-tuning of when grammars will be applied, and when they won't.

For example, suppose the following grammar rules are in effect:

```
(allow_if (slight game))
    (rule $restart_game (please restart the game)
        (= (event_name restart_game)))
(allow_if (high game_restart_confirmation))
    (rule $common_yes ($PT_Yes)
        (= (event_name yes)))
```

These grammar rules may dictate the circumstances under which a user may use various forms of natural language input to restart a game. The top rule only requires that the topic "game" be slightly relevant. For example, the top rule may remain in force so long as the topic "game" has a measure of relevance that satisfies some minimal threshold (e.g., >0). This may be true at any point while the user is playing the game, while the game is active in the background, etc. It makes sense that the top grammar is widely applicable because the natural language input that satisfies the top grammar—"please restart the game"—is a highly focused and unambiguous statement.

By contrast, the bottom rule requires that the topic "game_restart_confirmation" be highly relevant, e.g., by having a measure of relevance that satisfies some relatively stringent threshold. The topic "game_restart_confirmation" may only be raised when, for instance, the user makes a state such as "please restart the game," "maybe we should reset the game," "I want to start over," etc. Thus, the bottom rule allows the user to restart the game by providing various forms of simple affirmative response (e.g., $PT_Yes may include "yes," "OK," "sure," and so forth) only if the user is highly focused on restarting the game. The user may provide such affirmative input in response to a solicitation from automated assistant 120, such as "are you sure you want to restart the game?" If the user utters "yes" without such a topic being raised first, automated assistant 120 may provide output such as "I'm sorry, I didn't get that," or "what are you agreeing to?" While not required, generally speaking, the more focused natural language input is expected by a particular grammar, the higher the topic relevance requirement associated with that grammar will be.

In some implementations, grammar rules stored in grammar database 134 may be applicable in a variety of situations, e.g., when a variety of topics are relevant to a current human-to-computer dialog. For example a simple grammar rule for interpreting affirmative responses (e.g., "yes," "ok," "sure," "definitely," etc.) may be applicable in a wide range of situations. The following grammar rule demonstrates a few example scenarios in which such a grammar rule may be applicable:

```
(allow_if (high pizza_order_confirmation))
(allow_if (high quiz_quit_game_question))
(allow_if (high quiz_add_player_question))
(allow_if (high phone_call_retry_question))
    (rule $common_yes ($PT_Yes)
        (= (event_name yes)))
```

With such a grammar rule, whenever any of the topics "pizza_order_confirmation," "quiz_quit_game_question," "quiz_add_player_question," or "phone_call_retry_question" have high measures of relevance, the user may be able to provide a simple affirmative response (e.g., "yes," "OK," "yeah," "sure," etc.). This grammar requires that the topics be highly focused (i.e. relatively high measures of relevance) in order to be applicable. This is because each of the topics is raised only when automated assistant 120 asks a question seeking a simple yes or no response. It is unlikely that more than one of these topics will have a sufficiently high measure of relevance to be applicable in any given scenario. Even if more than one of these topics is currently persisted in contextual data structure 152, only the most recently-raised topic is likely to satisfy the stringent relevance requirement.

In some implementations, a grammar rule stored in grammar database 134 may be associated with multiple topics. For example, take the following grammar rule:

```
(allow_if (medium person) (medium person))
   (rule $were_married (were they ever married)
      (= (event_name were_married)))
```

This rule may be applicable when multiple different people have at least medium measures of relevance. Thus, for instance, the following human-to-computer dialog may be enabled:
  USER: Who is the lead vocalist of Iron Maiden?
  AA: It's Bruce Dickinson.
  USER: Who performed the Paparazzi song?
  AA: It was Lady Gaga.
  USER: Were they ever married?
  AA: No, they were not.
Two distinct instances of the topic "person" were raised: one for "Bruce Dickinson" and another for "Lady Gaga." Thus, when the user asks the question, "Were they ever married?", automated assistant 120 may apply the grammar rule above to obtain information indicating that the two people were, in fact, never married.

In some implementations, grammar rules may be applicable to topics that may be raised by sources other than the user or automated assistant 120. Suppose the following grammar rule is in effect:

```
(allow_if (point_of_interest))
   (rule $who_built (google who built it)
      (= (event_name who_built)))
```

This grammar rule may be applicable when any point of interest is currently persisted in contextual data structure 152, no matter how high or low the measure of relevance may be. And while the "point_of_interest" topic may be added by a user or by automated assistant 120, it also may be added by a component such as a position coordinate sensor (e.g., Global Positioning System, or "GPS") in a computing device carried by the user. Suppose the user stands in front of the Eiffel Tower (causing the topic "point_of_interest" to be added to contextual data structure 152) and asks, "Who built it?" Automated assistant 120 may apply the above grammar rule to parse the user's natural language input, and may return the answer "The Eiffel Tower was built by Gustave Eiffel."

Response subsystem 140 may receive parses and topics from grammars that are selected and applied by parser subsystem 130. In various implementations, response subsystem 140 may include a dialog engine 142 that employs a dialog tree 144 to steer the ongoing human-to-computer dialog between seemingly unrelated topics. In essence, the response subsystem receives one or more parses (or interpretations) and topics from the parser subsystem, and steers the conversation along the dialog tree based on the parses and topics.

For example, in some implementations, each node in dialog tree 144 represents a natural language process. A root node of the dialog tree 144 may be configured to handle any natural language input (either by initiating a process or by requesting disambiguation from the user) and to initiate one or more child nodes corresponding to processes that are initiated in response to natural language input from the user. The child processes may themselves add additional child processes to handle various aspects of their own internal dialog. This may simplify code maintenance and reuse, as each process may be a modular process that is configured to implement techniques described herein.

Whenever response subsystem 140 generates a response (e.g., a natural language response, a responsive action or task, etc.) for the user, response subsystem 140 may add any related topics to the contextual data structure 152. In some implementations, each node of the dialog tree may be associated with one or more topics (which may, for instance, be selected by a developer of the process underlying the node). As noted above, each grammar also may be associated with one or more topics. Consequently, by adding these topics to the contextual data structure, the response subsystem in effect adds the number of grammars that may be applicable by parser subsystem 130 at any point in time. Thus, if a user converses about one topic, changes course, then returns to the original topic (or to a semantically-related topic), grammars associated with that original topic may still be applicable because their associated topics are still persisted in the contextual data structure 152. But as noted above, if the human-to-computer dialog strays from a given topic for long enough, in some implementations, the topic may be dropped from the contextual data structure 152, e.g., to prevent parser subsystem 130 from applying an excessive number of grammars to each natural language input, which as noted above can become computationally expensive.

In addition to or instead of simply conversing with the user using techniques described herein, automated assistant 120 may also initiate one or more tasks based on natural language input provided by the user. According, application engine 160 may maintain or otherwise have access to an application library 162. Applications in application library 162 may be installed on one or more client devices 106, may be processes that are available to automated assistant 120, e.g., web processes, cloud processes, etc., and/or may be processes that are built in to automated assistant 120. More generally, applications in application library 162 may be processes that are available to automated assistant 120 during a human-to-computer dialog.

As will be described in more detail below, response subsystem 140 may maintain, e.g., as dialog tree 144, a graph of nodes corresponding to interactive natural language processes that have been initiated and/or accessed by automated assistant 120 during a human-to-computer dialog session. As automated assistant 120 accesses new processes, nodes representing those processes may be added as child nodes to the aforementioned root node. In some implementations, child node processes may likewise add additional child node processes as needed.

In some implementations, each child node process may be compatible with the techniques and framework described herein. For example, each child node process may be associated with one or more topics. These topics effectively associate each child node with grammars that are also associated with the same topics. If natural language input is received that does not satisfy a most recently-added child node process—i.e., the natural language input raises a topic that is inapplicable to any topic of the most recently-added child node process—it is possible that other, previously-added child node processes may have associated topics that are applicable to (e.g., match) the newly raised topic. In this manner, a user is able to seamlessly revert back to a previous topic of the human-to-computer dialog session without necessarily requiring automated assistant 120 to retrace a state machine associated with a previously-raised child node process.

FIG. 2 depicts a simple example of how one or more grammars 270 may be applied during a human-to-computer dialog session 272 between a user and automated assistant 120 ("AA" in the Figures). In this example, a top-most of grammars 270 may be applicable if the topic of "person" has a measure of relevance that is deemed to be "high" (e.g., satisfies a threshold). The dialog begins with the user providing natural language input in the form of a question, "What's this music?" (assume there is music being played, either by automated assistant 120 or detected as ambient sound). As indicated by the bold lettering, in some implementations, the user's natural language input may be analyzed, e.g., by parser subsystem 130 and/or dialog context engine 150, to determine that the topic "music" should be added to the topics currently persisted in contextual data structure 152. At this point in time, a measure of relevance associated with the topic "music" may be relatively high/strong, because the topic was just added.

Automated assistant 120 responds by stating, "It's Opus in C Sharp Minor by Chopin." Automated assistant 120 may determine this answer, for instance, because automated assistant 120 itself initiated playback of the music, or by utilizing various sound-processing techniques to identify the music based on one or more audible characteristics. As indicated by the bold lettering, in various implementations, topics such as "person," "artist," "composer," and/or "Chopin" may be added to the topics currently persisted in contextual data structure 152. At this point in time, a measure of relevance associated with the topics "person" and/or "Chopin" may be relatively high/strong, because the topic was just added. In some implementations, the measure of relevance associated with the previously-added topic of "music" may be decreased/weakened, e.g., because it has now been one turn since the topic of music was raised. However, in other implementations, because the topic "Chopin" (a composer) is has a close semantic relationship with the topic "music," the measure of relevance associated with the topic "music" may not be decreased/weakened because the topic "music" is clearly still relevant to the human-to-computer dialog.

Next, the user provides natural language input that includes, among other things, the question, "Where was he born?" Because the topic "person" was just raised during the immediately preceding turn (and thereby added to contextual data structure 152), the topic "person" may still have a relatively strong or high measure of relevance. Accordingly, grammar 270 may be applied, e.g., by parser subsystem 130, to determine that the natural language input "where was he born" should trigger an event, called "where_person_born," that causes parser subsystem 130 to provide a parse and/or interpretation to response subsystem 140 that causes response subsystem 140 to determine a birthplace of the person most recently referenced during the dialog (Chopin), and to return the response, "He was born in Żelazowa Wola." Meanwhile, response subsystem 140 may also add, or cause dialog engine 150 to add, topics such as "city" and/or "Żelazowa Wola" to contextual data structure 152. As before, measures of relevance associated with topics raised during prior turns (e.g., "music," "person," "Chopin") may or may not be decreased, e.g., depending on whether they are semantically related to the newly added topics.

Next, the user provides natural language input that asks the question, "Where is that?" It should be noted that had the user initiated a new human-to-computer dialog session with automated assistant 120 by asking such an ambiguous question, without the benefit of any prior conversational context, automated assistant 120 may not have been able to provide a response to this question without soliciting further disambiguating information from the user. However, because the topic "city" was just added to contextual data structure 152 in the preceding turn, and hence has a relatively high measure of relevance, parser subsystem 130 may be able to apply the second grammar of grammars 270 to the user's natural language input. Parser subsystem 130 may provide the resulting parse or interpretation (e.g., event_name="where_city_located") to response subsystem 140, as well as any new applicable topics. Based on this parse (and topic), response subsystem 140 may obtain (e.g., from various sources such as knowledge graphs, searchable documents, etc.) responsive information and provide natural language output, "Żelazowa Wola is a city in Masovian district in Poland." Similar as before, topics such as "district," "country," and/or "Poland" may be added, e.g., by response subsystem 140 and/or dialog context engine 150, to contextual data structure 152.

The user then provides natural language input asking the question, "How far from the capitol?" Again, without prior context, it is unlikely that automated assistant 120 could answer such a question without soliciting disambiguating information from the user. However, with the topics "Żelazowa Wola" and "Poland" still being relatively "fresh" (i.e. still have relatively high measures of relevance) in this particular human-to-computer dialog session, automated assistant 120 is able to more directly answer the question. For example, parser subsystem 130 may apply the third grammar down to the user's natural language input to trigger an event, "identify_capitol," that returns a capitol of a currently relevant country or district (in this example, "Warsaw"). Also, in some implementations, topics such as "capitol" may be added to contextual data structure 152. Then, parser subsystem 130 may apply the fourth grammar down to a combination of the user's natural language input and the identified capitol. The resulting parse or interpretation (e.g., event_name="distance_between_cities") may be provided to response subsystem 140. Based on this parse, response subsystem 140 may obtain responsive information and provide natural language output, "It's 39 miles away."

The next two turns of human-to-computer dialog 272 particularly underscore one technical advantage provided by techniques described herein, namely, abruptly changing domains of conversation. The user provides natural language input that asks, "Do you know any similar artists?" As noted above, the topic of "artist" was added to contextual data structure 152 relatively early during human-to-computer dialog 272, and has not been raised in multiple dialog turns. Consequently, a measure of relevance associated with the topic "artist" may have decreased/weakened considerably. Nonetheless, the bottom grammar of grammars 270 specifies that even if the topic "artist" is associated with a relatively low measure of relevance, that grammar may nonetheless be applicable. Accordingly, parser subsystem 130 may apply that grammar to generate a parse for response subsystem 140. In response to the parse, response subsystem 140 may then trigger an event, "find_similar_artists," that initiates a search for other similar artists (e.g., they create aesthetically similar art, are similar demographically, operated in similar time periods, etc.). Response subsystem 140 may then provide the natural language output, "Sure, I recommend Franz Liszt, Ludwig van Beethoven or Franz Schubert."

Figure 3:
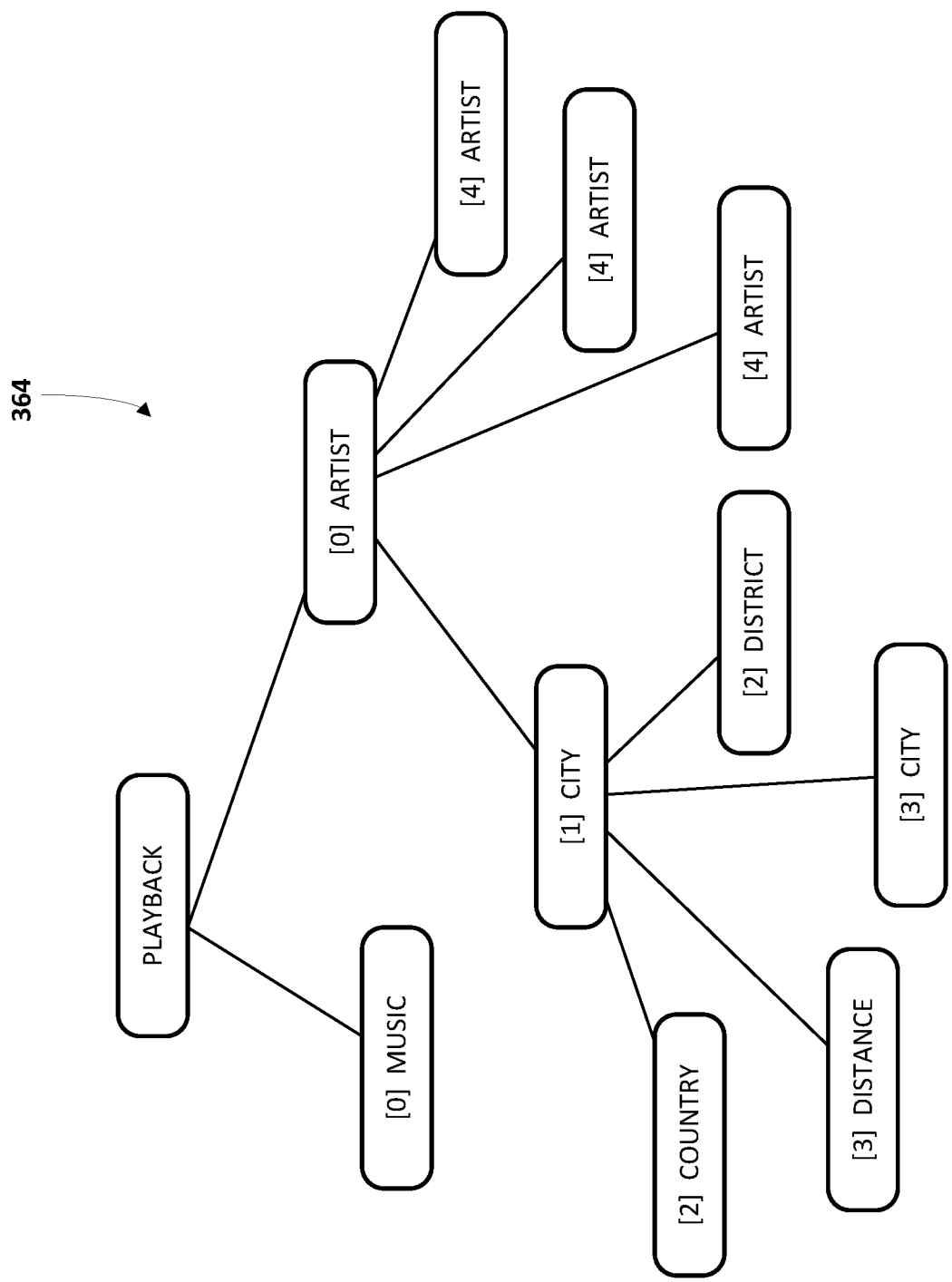
FIGS. 3, 4, and 5 depict example contextual data structures, in accordance with various implementations.

FIG. 3 depicts one example of how contextual data structure 152 may be implemented logically. In this example, contextual data structure 152 is formed as an undirected graph 364 with a plurality of nodes and a plurality of edges connecting the plurality of nodes. Each node of undirected graph 364 may represent a given topic of the one or more topics persisted as part of contextual data structure 152. In some implementations, each node may also store a count of turns of the ongoing human-to-computer dialog since the given topic was last raised.

Undirected graph 364 includes nodes corresponding to topics that may have been added to contextual data structure 152 during human-to-computer dialog 272 of FIG. 2. The brackets preceding each topic represent the turn number in which that topic was last raised, which were also indicated in FIG. 2. Thus, for example, the topics of "music" and "artist" were raised during the first ([0]) turn (which includes both the user's natural language input and a response from automated assistant 120, although this is not required). The topic "city" was raised during the second ([1]) turn when automated assistant 120 mentioned "Żelazowa Wola." The topics "country" and "district" were raised during the third ([2]) turn when automated assistant 120 mentioned "Poland" and "Masovian district," respectively. The topics "distance" and "city" were raised during the fourth ([3]) turn when the user requested the distance to the capitol. The topic "artist" was raised three times during the fifth ([4]) turn when automated assistant 120 provided three examples of artists similar to Chopin.

In some implementations, a measure of relevance of a particular topic may be determined simply by subtracting its associated dialog turn number (the latest dialog turn number if there are multiple nodes representing the topic) from the current turn number. The smaller the result, the more relevant the topic is to the dialog at present. However, and as was mentioned above, in other implementations, other factors are taken into account, such as relatedness of topics. For example, in some implementations, nodes representing topics being raised in the current dialog turn (whether they are newly added or updated) may be identified, e.g., as nodes A. A measure of relevance of a given topic may be determined during a current dialog turn by calculating, for each node in directed graph 364, the shortest distance $d_i$ to any node belonging to A. Additionally, a difference $a_i$ between the current dialog turn number and the node's turn number may also be calculated. The node's (and hence, topic's) measure of relevance may be set to the minimum of $d_i$ and $a_i$.

Figure 4:
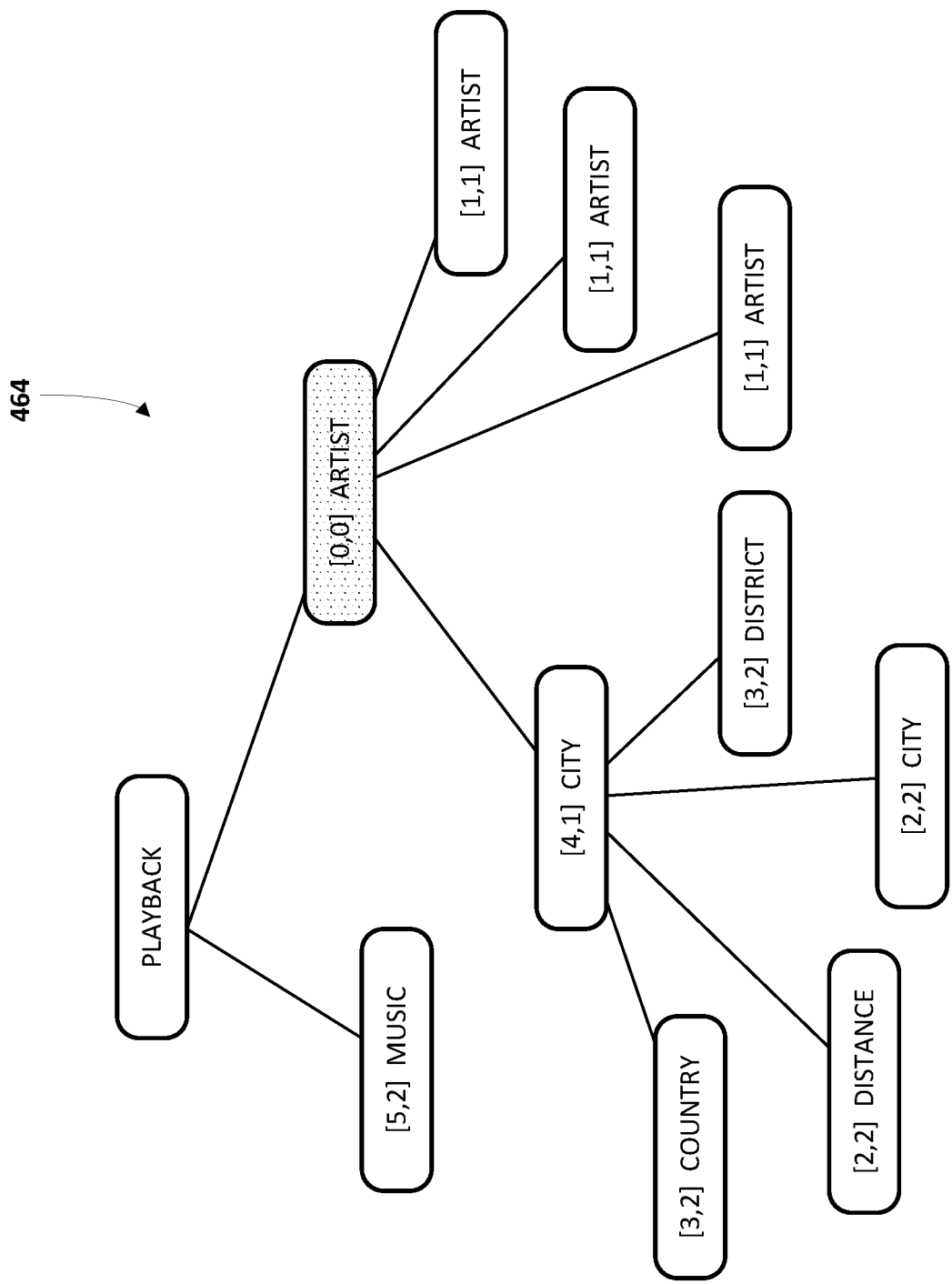
Figure 5:
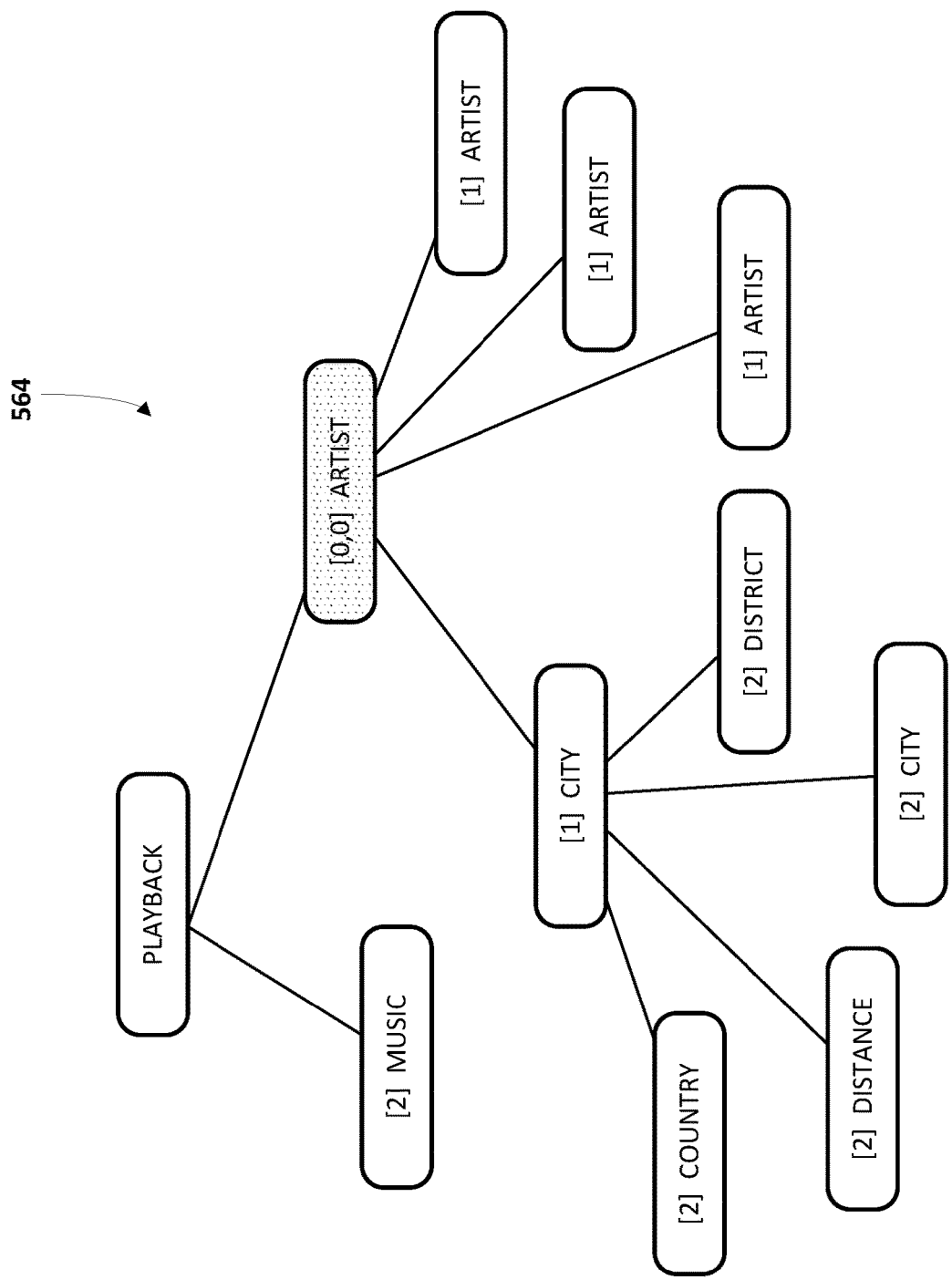

FIG. 4 depicts a similar undirected graph 464 as was depicted in FIG. 3. Assume for this example that the human-to-computer dialog 272 depicted in FIG. 2 is now entering the sixth ([5]) dialog turn, and that the shaded node ("artist") is raised during the current dialog turn ([5]). Each node of undirected graph 464 includes, on the left side of the brackets, a difference $d_i$ between the current dialog turn number ([5]) and the last dialog turn in which that topic was raised. Each node of undirected graph 464 also includes, on the right side of the brackets, the shortest path $a_i$ between that node and the newly added node of A. FIG. 5 depicts the measures of relevance determined for each node/topic based on the minimum of $d_i$ and $a_i$. Determining measures of relevance in such a fashion may account for the scenario in which a particular topic has not been mentioned recently, but yet closely related topics have been mentioned recently. In such a scenario, the particular topic may still be at least indirectly relevant to the human-to-computer dialog, and thus it may make sense to temper how much the measure of relevance associated with that particular topic is diminished.

As noted above, response subsystem 140, e.g., by way of dialog engine 142, may control how automated assistant 120 participates in a human-to-computer dialog with a user. In some implementations, parses (or interpretations) of a user's natural language inputs may be provided to a hierarchal decision making process implemented by dialog engine 142, e.g., by way of using dialog tree 144. The hierarchal decision making process may, in some cases, include a hierarchy of processes (e.g., root and child process nodes of dialog tree 144) in which bigger processes govern some smaller processes.

Figure 6:
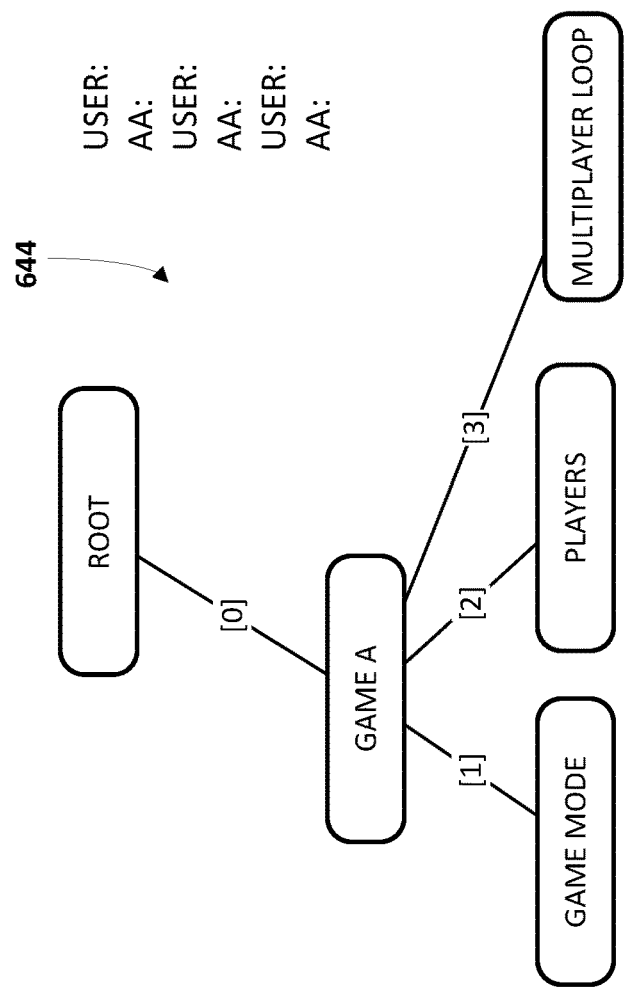
FIG. 6 depicts an example dialog tree according to implementations disclosed herein.

FIG. 6 schematically depicts a simple example of a dialog tree 644 that may be used during a human-to-computer dialog 670. This example shows how the more context is available (i.e., the more topics persisted in contextual data structure 152), the less the user needs to say in order to achieve some goal (e.g., obtain responsive answer from automated assistant 120, cause automated assistant to initiate a task, etc.). Assume for this example that the following grammar rules are defined for GAME A, which may be a trivia game:

```
(allow_always)
    (rule $play_game (I want to play Game A for three players)
        (= (event_name play_game_A) (players 3))
(allow_if (medium game_A))
    (rule $player_choice (I want three players)
        (= (event_name player_choice) (number 3))
(allow_if (high player_question))
    (rule $number ($PT_Number)
        (= (event_name number) (value 3))
```

From these grammar rules is it apparent that the user can always specifically state, at the outset, that he or she wants to play GAME A with three players. Such a statement includes all parameters required by GAME A to begin game play. If the topic "game_A" has at least a medium measure of relevance (e.g., the player said, "I want to play Game A" but did not provide additional information), then the player can say, "I want <non-zero integer> players" to begin game play. And if automated assistant 120 has just asked, "How many players?", then the topic "player_question" may have a sufficiently high measure of relevance that the user can simply provide a numeric response.

In human-to-computer dialog 672, the user begins by stating, "I want to play GAME A." Topic "game_A" (and potentially other topics such as "games") may be added to contextual data structure 152, and a GAME A child node is added to the root node. The GAME A child node may represent a child node process associated with GAME A. When developing such a child node process (or a plurality of child node processes that dictate dialog for a particular application), the developer may define (and store in grammar database 134 in some implementations) grammar rules such as those described above. In this example, GAME A includes three child node processes: GAME MODE (which controls whether single or multiplayer mode is implemented), PLAYERS (which controls how many players if multiplayer mode is implemented), and MULTIPLAYER LOOP (which controls multiplayer gameplay).

In accordance with the GAME MODE child process, automated assistant 120 replies, "OK, single player or multiplayer?" The player responds, "multiplayer." In some implementations, the child process associated with the node GAME MODE may interpret the user's input (e.g., using a grammar rule provided in association with the GAME MODE node) and provide the parse/interpretation to the process represented by GAME A node. Next, in accordance with the child process associated with the PLAYERS node, automated assistant 120 may ask, "how many players?" The player responds, "three." In some implementations, the child process associated with the node PLAYERS may interpret the user's input (e.g., using a grammar rule provided in association with the PLAYERS node) and provide the parse/interpretation to the process represented by GAME A node. Once the process associated with GAME A node knows the game mode (multiplayer) and the number of players (three), it may then pass control to the MULTIPLAYER LOOP node, which controls the dialog during gameplay.

In some implementations, each child node process of a dialog tree may be designed to perform three functions: handling specific user interpretations (i.e., parses), communicating with its closest parent node, and communicating with its closest child node. A child node process may perform the function of handling specific user interpretations by, for instance, being associated with one or more topics that are applicable in a current context (e.g., stored in the contextual data structure). In FIG. 6, the node associated with GAME A may be able to receive parameters needed to play the game from multiple sources, such as the user directly (e.g., by the user providing natural language input that is interpreted by a grammar associated with GAME A node), and/or from one or more child nodes (e.g., receive the mode of gameplay from GAME MODE node, receive the number of players from PLAYERS node).

Figure 7B:
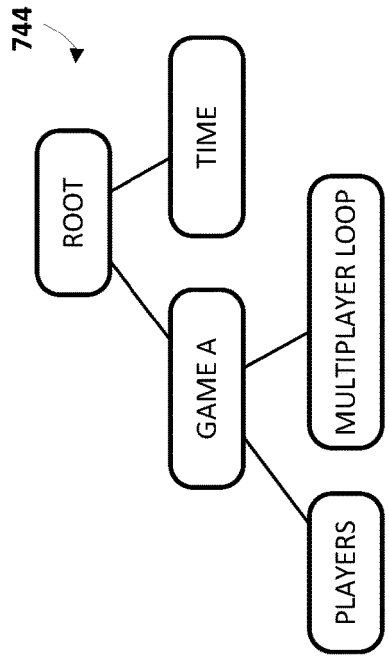
FIGS. 7A, 7B and 7C depict an example of how a dialog tree may be grown dynamically during a human-to-computer dialog, in accordance with various implementations.
Figure 7A:
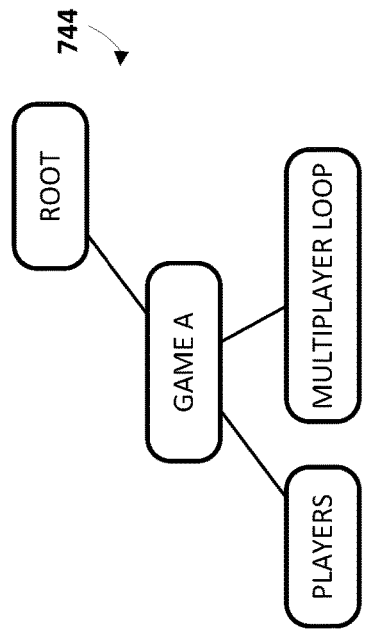
Figure 7C:
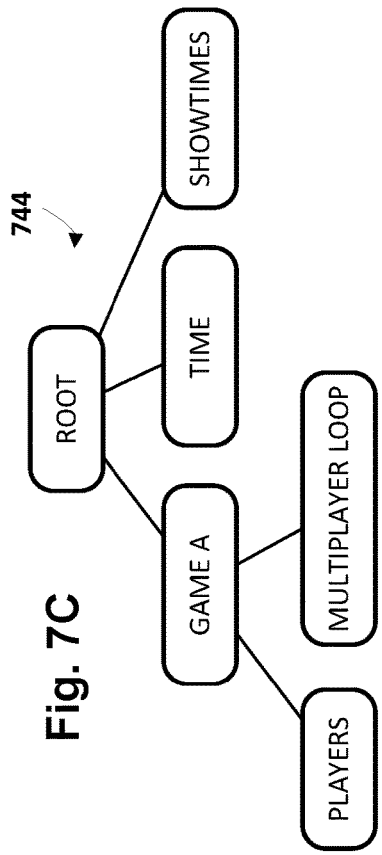

FIGS. 7A-C demonstrates how a dialog tree 744 may be dynamically generated during the following human-to-computer dialog:
  USER: I want to play GAME A
  AA: OK, how many players?
  USER: First, tell me the time
  AA: It's 7:15 PM
  USER: When does Game of Roses air today?
  AA: In 45 minutes, at 8 pm.
  USER: OK. I want three players
  AA: Sure, let's play. First question . . .
As described above, the user's first statement ("I want to play GAME A") is interpreted by the root node because there are not yet any topics in the contextual data structure. As depicted in FIG. 7A, the user's request may cause the child node process GAME A to be initiated, as well as the MULTI PLAYER LOOP node in some instances. In some implementations, automated assistant's response ("OK, how many players") may cause one or more additional child node processes to be added below the node GAME A, such as PLAYERS.

FIG. 7B depicts dialog tree 744 after the user abruptly changes subjects by saying, "First, tell me the time." When the user provides this statement, the topic "time" has not been added to contextual data structure 152. Accordingly, control is passed back to the root node, which handles natural language inputs when no topics associated with any active child process nodes are applicable to (e.g., match) a newly raised topic. The root node is able to interpret the user's request and initiate another child process node called TIME, which may be configured to return the current time.

FIG. 7C depicts dialog tree 744 after the user abruptly changes subjects again. This time, the user asks, "What time does Game of Roses air today?" Potentially applicable topics such as "television," "series," and so forth are not persisted in contextual data structure 152. Accordingly, control once again passes back to root, which interprets the user's natural language input and responds, "In 45 minutes, at 8 pm." Then, the user steers the subject back to GAME A, saying, "OK. I want three players. Because the topic "GAME A" is still persisted in contextual data structure 152, a grammar associated with the topic "GAME A" may be applicable by the GAME A child node process.

From the above description and examples it should be clear that in some implementations, child node processes in dialog trees are associated with topics. The presence of topics in contextual data structure 152 depends on the context of the ongoing human-to-computer dialog, which changes over time. Accordingly, the presence of child node processes in dialog trees may be dependent on the context of the ongoing human-to-computer dialog. The dialog tree thus dynamically changes over time as the context of the ongoing human-to-computer dialog changes.

In some implementations, child node processes may be implemented as classes in various programming languages (e.g., C++, Java, etc.). Each child node process may be configured to exchange information with its parent and children (if any), react to parses/interpretations of user-provided natural language input, persist some state, and in some cases, communicate with remote processes, such as remote procedure calls that may return pieces of information like weather, sports scores, news, television schedules, general information (e.g., information associated with entities in a knowledge graph), and so forth.

In some implementations, child node processes may include methods of statically defined interfaces. In a simplex communication, the response is not anticipated. Only the callee exposes an interface, as shown by the following sample code:
  void SomeChildClass::set_difficulty(int level);
In a duplex communication, on the other hand, the receiving side must be able to return the result back to the caller. Accordingly, both sides may expose interfaces:
  void SomeChildClass::ask_for_game_settings( );
  void ParentClass::game_settings_callback(const GameSettings & settings);
If template programming (e.g., in C++) is used, it may be possible to ensure that parent processes implement interfaces that are required by their children, e.g., to enable duplex communication. Consequently, bugs caused by inconsistencies in a communication protocol between a caller and a callee may be detected at compile time.

Such clearly defined communication interfaces may facilitate reuse of code. For example, suppose a process A is intended to use logic provided by process B. If process B does not return any data back to its parent process, then process A may simply add process B as a child. On the other hand, if process B is configured to return data to its parent process, e.g., through an interface IB, then process A may be configured to implement an interface IB, and then may add process B as a child.

In some implementations, each class implementing a process may implement a method responsible for handling a parse/interpretation of natural language input received from a user. A state of a class instance may be kept within a topic object associated with that class instance. Each class may have access to an inherited member providing an interface for doing various calls (e.g., remote procedure calls) to the outside world.

Figure 8:
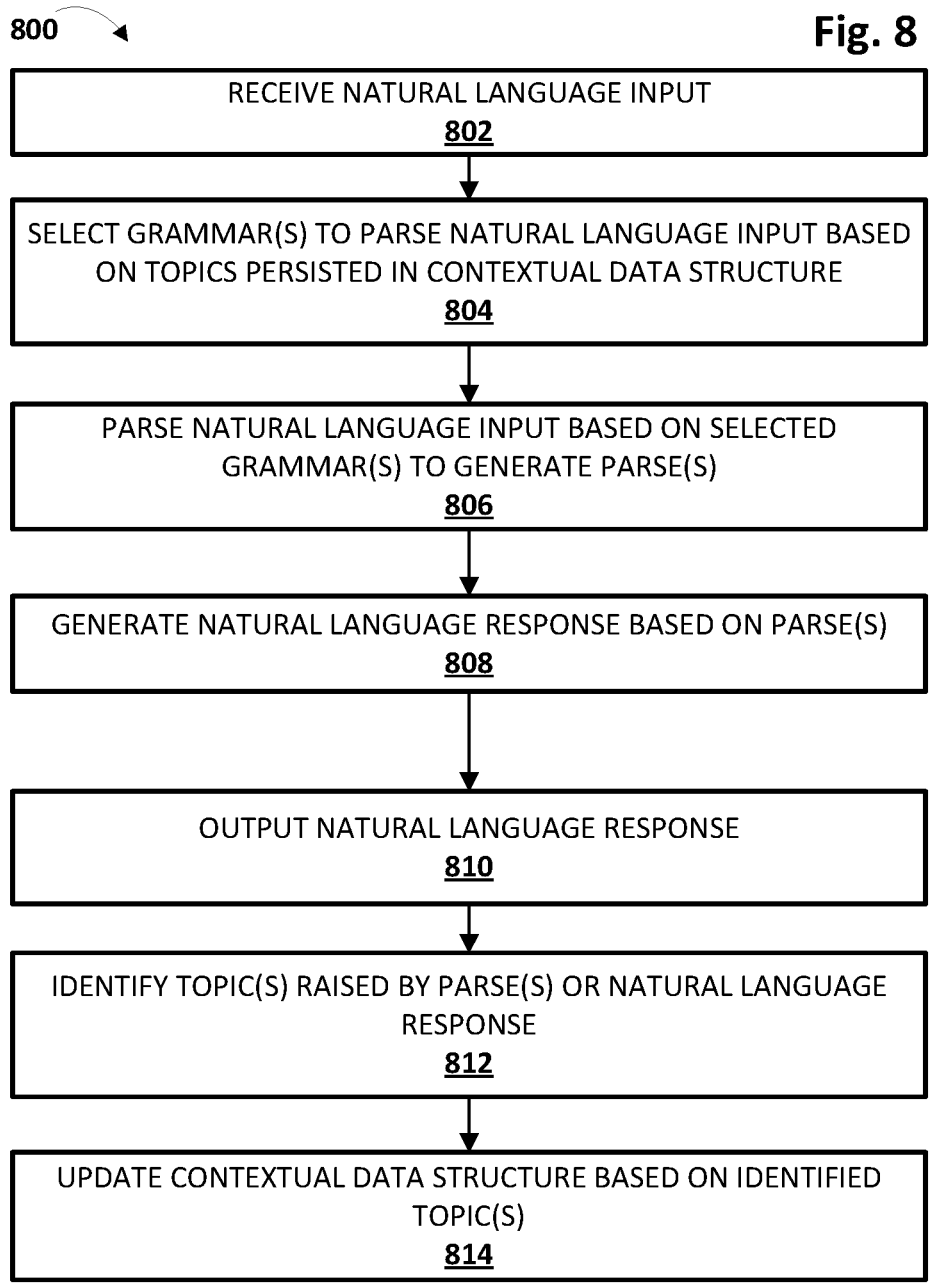
FIG. 8 depicts an example process of practicing various techniques described herein.

FIG. 8 is a flowchart illustrating an example method 800 according to implementations disclosed herein. For convenience, the operations of the flow chart are described with reference to a system that performs the operations. This system may include various components of various computer systems, such as one or more components of automated assistant 120. Moreover, while operations of method 800 are shown in a particular order, this is not meant to be limiting. One or more operations may be reordered, omitted or added.

At block 802, the system may receive natural language input from a user. The natural language input may be received in various forms via various types of input devices. For example, in some implementations, the input device may be a microphone, and the natural language input may be an audible utterance provided by the user. In some such implementations, tokens and other information may be extracted from the audio signal and used to generate text corresponding to the spoken input. In other implementations, the natural language input may be received, for instance, as typed or spoken input provided by the user in a message exchange thread using message exchange client 107.

At block 804, the system may select one or more grammars to parse the natural language input. This selection may be based on one or more topics that are persisted as part contextual data structure 152, and/or on measures of relevance associated with those topics. In implementations in which dialog trees are employed by response subsystem 140, if no topics are yet persisted in contextual data structure 152, or if no topics currently associated with any child process nodes are applicable to (e.g., match) the most recently raised topic, control may pass to the root node. The root node may then parse the natural language input and react accordingly (e.g., obtain information and provide a natural language response, initiate one or more applications/processes, etc.). If at the root node, the user's natural language input is not understood, then automated assistant 120 may ask the user for clarification.

At block 806, the system may parse the natural language input received at block 802 based on the grammars selected at block 804. In some implementations, it is possible that multiple grammars may be applicable, and thus may generate parses/interpretations of the natural language input. The system may select from these multiple (potentially conflicting) interpretations in various ways. In some implementations, the system may select the parse generated by the grammar that requires that its associated topic be the most focused (e.g., associated with a highest measure of relevance). Suppose, for instance, that a first grammar is associated with the topic "game" but only requires that the topic "game" have a medium or even slight measure of relevance. Suppose further that a second grammar, also associated with the topic "game," requires a relatively high measure of relevance. If the topic "game" currently is associated with a high measure of relevance—e.g., because it has just been recently raised or is semantically related to other recently-raised topics—both grammars may be applicable. However, the system may select the parse generated by the second grammar because of its higher focus threshold. In other implementations, the system may select from multiple parses/interpretations based on other signals, such as probabilities of each parse being the true intention of the user. For example, in some implementations, logs, measures of relevance, or other similar data points may be used to calculate probabilities that each of multiple parses matches the user's true intention. In instances in which multiple parses appear to have similar probabilities of being correct, the system may seek additional clarification and/or disambiguation from the user.

In some implementations, at block 808, the system may generate a natural language response based on the one or more parse(s) generated at block 806. In some such implementations, the natural language response may accompany the system also initiating some process, such as the trivia games described above. And while the trivia games provided above as examples were alluded to be integral with the automated assistant (i.e., they were described as IVR apps that integrated seamlessly into the ongoing human-to-computer dialog), this is not meant to be limiting. In various implementations, the system may initiate a task that does not involve IVR, such as opening an application (e.g., a telephone app, a calendar app, a social networking app, a graphical video game, a fitness app, etc.) that is not necessarily controlled using spoken or typed natural language input. At block 810, the system may output the natural language response generated at block 808. For example, the automated assistant may answer a user's question, seek another parameter for a process, engage in conversation with the user, provide output indicating that the automated assistant is initiating another application, and so forth.

At block 812, the system may identify topics that were raised by the parse(s) generated at block 806 and/or the natural language response generated at block 808. At block 814, the system may update the contextual structure based on the identified topics. If the topics have not yet been added to the contextual data structure, they may be added. If the topics are already persisted as part of the contextual data structure, they may be "touched," e.g., by increasing a measure of relevance associated with those topics. Additionally, in some implementations, other topics in the contextual data structure 152 that are semantically related to newly-raised topics may also be "touched," e.g., to the same degree as the added topics or, in some cases, to a lesser degree.

Figure 9:
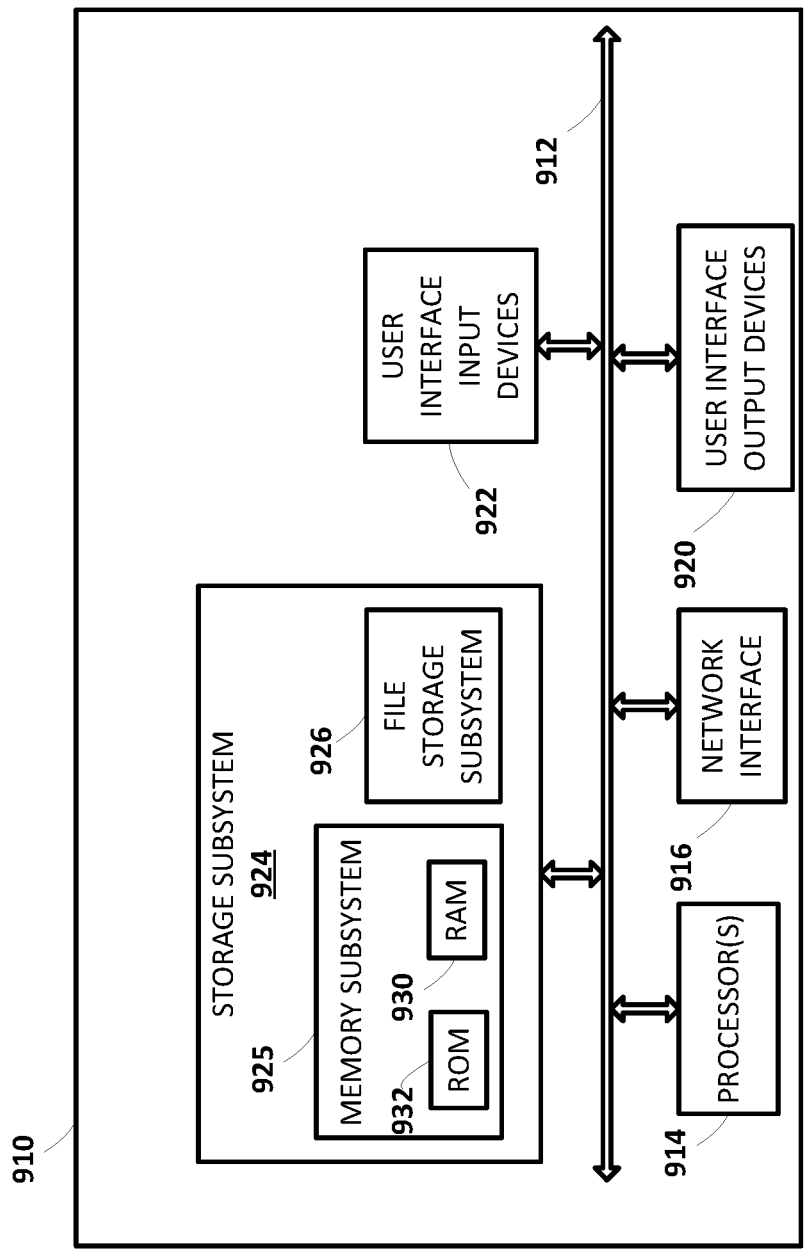
FIG. 9 illustrates an example architecture of a computing device.

FIG. 9 is a block diagram of an example computing device 910 that may optionally be utilized to perform one or more aspects of techniques described herein. In some implementations, one or more of a client computing device, automated assistant 120, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method of FIG. 8, as well as to implement various components depicted in FIG. 1.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which certain implementations discussed herein may collect or use personal information about users (e.g., user data extracted from other electronic communications, information about a user's social network, a user's location, a user's time, a user's biometric information, and a user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
receiving natural language input from a user as part of an ongoing human-to-computer dialog between the user and an automated assistant operated by one or more processors, wherein one or more topics raised previously during the ongoing human-to-computer dialog are stored in memory as part of a contextual data structure associated with the ongoing human-to-computer dialog;
selecting, from a plurality of grammars associated with a plurality of respective topics, one or more grammars to parse the natural language input, wherein the selecting is based on one or more respective measures of relevance of the previously-raised one or more topics to the ongoing human-to-computer dialog, wherein the measure of relevance associated with each given topic of the one or more topics is determined based at least in part on a count of turns of the ongoing human-to-computer dialog since the given topic was last raised, wherein the count of turns since the given topic was last raised is inversely related to relevance of the given topic to the ongoing human-to-computer dialog;
parsing the natural language input based on the selected one or more grammars to generate one or more parses;
generating, based on one or more of the parses, a natural language response;
outputting the natural language response to the user using one or more output devices;
identifying one or more topics raised by one or more of the parses or the natural language response; and
adding the identified one or more topics to the contextual data structure.

2. The computer-implemented method of claim 1, wherein the measure of relevance associated with each given topic of the one or more topics is determined based at least in part on a measure of relatedness between the given topic and one or more other topics of the one or more topics in the contextual data structure.

3. The computer-implemented method of claim 1, wherein the contextual data structure comprises an undirected graph comprising a plurality of nodes and a plurality of edges connecting the plurality of nodes.

4. The computer-implemented method of claim 3, wherein each node of the undirected graph represents a given topic of the one or more topics stored as part of the contextual data structure, and a count of turns of the ongoing human-to-computer dialog since the given topic was last raised.

5. The computer-implemented method of claim 4, wherein each edge connecting two nodes represents a measure of relatedness between two topics represented by the two nodes, respectively.

6. The computer-implemented method of claim 1, further comprising generating a dialog tree with one or more nodes that represent one or more interactive voice processes that have been invoked during the ongoing human-to-computer dialog.

7. The computer-implemented method of claim 6, wherein one or more of the nodes is associated with one or more topics.

8. The computer-implemented method of claim 7, wherein the selecting comprises selecting the one or more grammars from one or more grammars associated with the one or more topics.

9. A system comprising one or more processors and memory operably coupled with the one or more processors, wherein the memory stores instructions that, in response to execution of the instructions by one or more processors, cause the one or more processors to:
receive natural language input from a user as part of an ongoing human-to-computer dialog between the user and an automated assistant operated by one or more processors, wherein one or more topics raised previously during the ongoing human-to-computer dialog are stored in memory as part of a contextual data structure associated with the ongoing human-to-computer dialog;
select, from a plurality of grammars associated with a plurality of respective topics, one or more grammars to parse the natural language input, wherein the selecting is based on one or more respective measures of relevance of the previously-raised one or more topics to the ongoing human-to-computer dialog, wherein the measure of relevance associated with each given topic of the one or more topics is determined based at least in part on a count of turns of the ongoing human-to-computer dialog since the given topic was last raised, wherein the count of turns since the given topic was last raised is inversely related to relevance of the given topic to the ongoing human-to-computer dialog;
parse the natural language input based on the selected one or more grammars to generate one or more parses;
generate, based on one or more of the parses, a natural language response;
output the natural language response to the user using one or more output devices;
identify one or more topics raised by one or more of the parses or the natural language response; and
add the identified one or more topics to the contextual data structure.

10. The system of claim 9, wherein the measure of relevance associated with each given topic of the one or more topics is determined based at least in part on a measure of relatedness between the given topic and one or more other topics of the one or more topics in the contextual data structure.

11. The system of claim 9, wherein the contextual data structure comprises an undirected graph comprising a plurality of nodes and a plurality of edges connecting the plurality of nodes.

12. The system of claim 11, wherein each node of the undirected graph represents a given topic of the one or more topics stored as part of the contextual data structure, and a count of turns of the ongoing human-to-computer dialog since the given topic was last raised.

13. The system of claim 12, wherein each edge connecting two nodes represents a measure of relatedness between two topics represented by the two nodes, respectively.

14. At least one non-transitory computer-readable medium comprising instructions that, in response to execution of the instructions by one or more processors, cause the one or more processors to perform the following operations:
receiving natural language input from a user as part of an ongoing human-to-computer dialog between the user and an automated assistant operated by one or more processors, wherein one or more topics raised previously during the ongoing human-to-computer dialog are stored in memory as part of a contextual data structure associated with the ongoing human-to-computer dialog;
selecting, from a plurality of grammars associated with a plurality of respective topics, one or more grammars to parse the natural language input, wherein the selecting is based on one or more respective measures of relevance of the previously-raised one or more topics to the ongoing human-to-computer dialog, wherein the measure of relevance associated with each given topic of the one or more topics is determined based at least in part on a count of turns of the ongoing human-to-computer dialog since the given topic was last raised, wherein the count of turns since the given topic was last raised is inversely related to relevance of the given topic to the ongoing human-to-computer dialog;
parsing the natural language input based on the selected one or more grammars to generate one or more parses;
generating, based on one or more of the parses, a natural language response;
outputting the natural language response to the user using one or more output devices;
identifying one or more topics raised by one or more of the parses or the natural language response; and
adding the identified one or more topics to the contextual data structure.

* * * * *